No. 872,314. PATENTED NOV. 26, 1907.
J. M. WILSON.
PROCESS OF REMOVING PAINT AND VARNISH.
APPLICATION FILED AUG. 1, 1907.
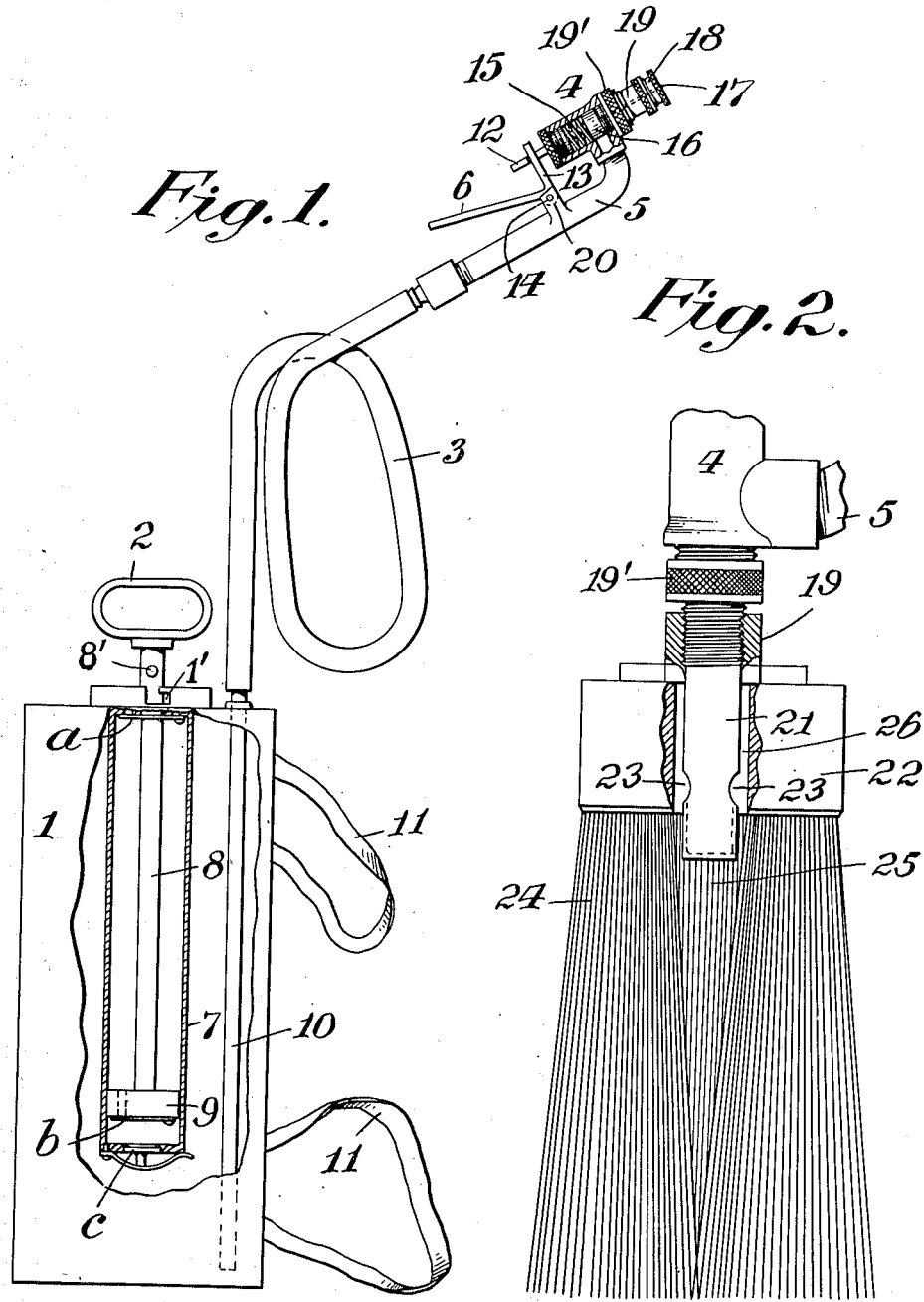
Attest:
Inventor:
John M. Wilson,
by his attorneys,
Byrnes, Townsend & Swenarton.

_UNITED STATES PATENT OFFICE._

JOHN M. WILSON, OF MONTCLAIR, NEW JERSEY.

PROCESS OF REMOVING PAINT AND VARNISH.

No. 872,314.	Specification of Letters Patent.	Patented Nov. 26, 1907.

Application filed August 1, 1907. Serial No. 386,651.

_To all whom it may concern:_

Be it known that I, JOHN M. WILSON, a citizen of the United States, residing at Montclair, in the county of Essex and State of New Jersey, have invented certain new and useful Improvements in Processes of Removing Paint and Varnish, of which the following is a specification.

My invention relates to improvements in those processes of removing dried films of paint and varnish, wherein non-alkaline, film-forming compositions containing volatile paint and varnish solvents, or non-alkaline compositions consisting entirely of volatile paint and varnish solvents or other wholly volatile compounds, are employed to dissolve the said films and cut the oily ingredients thereof, thereby rendering them susceptible of being readily removed with a cloth, scraper or the like.

Heretofore, when using film-forming, non-alkaline removers, commonly termed neutral removers because of the absence of corrosive alkalies therein, it has been the universal practice to apply the same to the surfaces to be treated by manual dipping of an ordinary paint brush into a body of the remover contained in an open-mouthed receptacle, as the characteristic property possessed by said removers is that of immediate formation of a viscous, impervious film upon exposure to the atmosphere, and this property apparently precluded their application in any other manner. Moreover, the attempted application by atomization of a volatile remover, _i. e._, a remover free from aqueous, acid and alkaline solvents, etc., or, in other words, the simultaneous ejection of a jet of air and liquid thoroughly commingled through a common outlet nozzle, as is one of the customary methods employed in the application of paint to large, exposed areas of the particular surfaces to be treated, results in the rapid diminution in strength of the said neutral remover owing to the rapid volatilization of the volatile solvents contained therein, which solvents are mechanically entrained and mechanically volatilized by the commingled air. Moreover, the presence of numerous air bubbles throughout the liquid not only prevents perfect contact of the remover with the dried film of paint or varnish to be treated, but also the said air bubbles tend to clog up the minute pores of the said films and prevent the penetration of the volatile solvents into the pores and beneath the paint or varnish film.

The objects of my invention are to secure an efficient penetration of a film-forming neutral remover, or a non-film-forming neutral remover in its normal condition into the pores of the paint or varnish surfaces treated and to more effectively retard the evaporation of the volatile solvents of said removers, and particularly of the non-film-forming removers, by forcibly projecting the same into and through the said paint or varnish film treated. In addition to these features, I am also enabled to conserve the strength of the remover and maintain the same in a uniform condition throughout the period of treatment and the escape of objectionable vapors of an explosive nature or of a poisonous or deleterious nature is thereby substantially eliminated.

My experiments have led to the discovery that neutral removers can be satisfactorily applied only by the forced-jet method, as distinguished from atomizing methods, and as hereinafter more fully set forth in the following specification and drawings which form a part thereof.

In the drawings Figure 1 is an elevation of the pressure-ejector, partially broken away to show the construction of the valves in the air pump and in the ejector nozzle. Fig. 2 is a detailed elevation, partially in section, of a modified nozzle having a brush-like envelop therefor.

Referring to the drawings the reference numeral 1 represents a pressure-tank having an intake-valve _a_, the numeral 2 the handle of an air-pump adapted to create pressure in said tank, and the numeral 3 a flexible hose or connection adapted to be attached to the curved hollow extension-arm 5 communicating with the nozzle 4. A lever 6, having an off-set 13, is adapted to operate the valve-stem in said nozzle, as hereinafter described. The numeral 7 designates the barrel of the air-pump serving to create pressure within the said pressure-tank. A piston-rod 8, provided at its upper end with a lug 8' which is adapted to enter and be retained within a bayonet-slot 1', on the upper end of said tank, connects a plunger-piston 9 provided with an upwardly-seating valve _b_, with a handle 2, and thus in the manner well understood compressed air may be collected above the body of liquid which may be introduced within the pressure-tank by the reciprocal operation of the handle 2, whereby air escapes through the spring-operated valve c in the bottom of said air-pump into the pressure-tank, which pressure creates a flow of liquid through the outlet-pipe 10 when the valve, hereinafter described, in the nozzle 4 is opened. A strap 11 serves to suspend the unitary device from any desired support. The nozzle 4 is provided with a valve-stem 12 which is engaged by the off-set end 13 of the lever 6 and retained therein by a cotter-pin 14. A spring 15 serves to normally seat a needle-valve 17, which is secured to the end of said valve-stem 12, and the said spring thus normally causes the cylindrical piston 16 to close the opening in the end of the hollow curved extension-arm 5, and thus normally the flow of liquid through the said needle-valve in the thimble 18 is prevented. A nut 19 serves to lock the thimble 18, which is threaded into the end of said nozzle 4 and permits of the accurate adjustment of the thimble and the regulation of the size of the outlet therein. The lever-arm 6 is pivoted at 20, as shown, in such a manner that normally the off-set end 13 extends transversely across the rear end of the nozzle 4, which serves as a support for said off-set end when in this position.

In Fig. 2 is disclosed a modified form of nozzle adapted for applying heavy or thick removers in a manner analogous to that herein described for the application of thin, readily flowing neutral removers, either containing film-forming ingredients or not. The numeral 21 designates a hollow pipe which is adapted to be threaded into the head 22 of a hollow brush. The projecting end of said pipe is provided with a thread adapted to fit the corresponding thread in the end of the nozzle 4. The said pipe 21 extends somewhat beyond the perforated head of said brush and is provided with oppositely disposed lateral openings communicating with the hollow interior of said pipe, as shown at 23. The bristles 24 are arranged on the brush in the usual manner with the exception that they are moved in order to permit of the insertion of the hollow pipe 21 at the center of said head 22 and centrally disposed within said bristles.

Having thus described the construction of the apparatus used in carrying out my process, I will now proceed to describe the said process in detail.

A neutral remover consisting, for example, of one quart of methyl alcohol, to which is added a solution of two and a half ounces of paraffin wax and three quarts of benzol (benzene), and also a viscous solution of collodion, preferably about two and a half ounces, said collodion consisting of ninety-two and a half per cent. of an ethyl acetate and alcohol mixture, and seven and a half per cent. of nitro-cellulose, preferably pyroxylin, is placed in said container or pressure-tank, preferably sufficient to occupy three-quarters of the capacity thereof. Compressed air is then ejected into said tank by reciprocating the piston 9 about ten or twelve times, and then locking the said piston rod 8 in order to prevent movement thereof due to the pressure of confined air.

Various removers may be employed for this purpose, but preferably when applying the remover in the form of a spray and without the employment of a brush as heretofore described, I employ a mixture consisting of one quart of methyl alcohol and three quarts of benzol (benzene), said mixture being entirely free from any film-forming ingredients. When employing the brush-like nozzle heretofore described, the following mixture can be advantageously employed: (1) one quart of methyl alcohol, to which is added a solution of one-half pound of beeswax in three quarts of benzol (benzene). To this is added a viscous solution to the amount of approximately one pound, said viscous mixture consisting substantially of ninety-two and a half per cent. of a mixture of alcohol and ethyl acetate, the latter in relatively small quantities, and seven and a half per cent. of nitro-cellulose, preferably pyroxylin, although other nitro-celluloses of a lower degree of nitration may be substituted therefor. Or again the following non-aqueous remover may be employed: (2) A mixture of one-quarter pound of bees wax, one quarter pound of paraffin, or if desired one-eighth pound of paraffin and one-eighth pound of stearin may be employed in lieu of the paraffin, is heated with one half to three-quarters of a pound of carbolic acid crystals (phenol) until substantially dissolved therein and to this mixture is added seven pounds of a second mixture consisting of six pounds of methyl alcohol and one pound of a collodion mixture containing approximately 92 1/2% of solvent, for example ethyl alcohol and ethyl acetate, the latter in relatively small quantities, and 7 1/2% of nitro-cellulose, or other compounds of a similar nature, as acetate of cellulose.

Having created a pressure within the tank which contains the remover free from aqueous acid and alkaline solvents of paint and varnish in sufficient quantities to materially retard the evaporation of the volatile non-aqueous solvents, the remover can be easily applied to the surface to be treated by exerting a slight pressure upon the lever 6, whereupon a substantially continuous jet of the remover free from commingled air-bubbles, is ejected through the opening in the thimble 18, adjusted to the desired degree as heretofore stated. The flexible hose 3 is manipulated as desired in order that the nozzle 4 may be brought in proximity to the surface to be treated.

The application of the liquid remover, whether containing waxy bodies in solution or suspension therein, as claimed in my copending application, filed May 10, 1907, #373,513, of which this is a continuation, or whether as herein claimed, the remover utilized is free from waxy, film-forming bodies and of such a nature that when applied with a brush in the ordinary manner its efficiency is destroyed by the rapid evaporation whereby its use is rendered impracticable, is so instantaneous, subsequent to its removal from the container or pressure tank, that the loss by evaporation is practically *nil*. Moreover since the remover is forcibly injected into the pores of the film of paint or varnish treated and beneath said film, even though no waxy, film-forming ingredients are present, the escape of the non-aqueous volatile solvents of paint and varnish is materially retarded.

The remover free from aqueous acid and alkaline solutions of paint and varnish solvents in sufficient amounts to of themselves materially retard the evaporation of the volatile, non-aqueous solvents of paint and varnish, while preferably used in this apparatus, owing to the fact that it is an auto-wash, *i. e.*, no auxiliary wash of benzin or alcohol is required to supplement the treatment and prior to the application of fresh coats of paint or varnish, is by no means the only type of remover which can be used, as heretofore explained. Preferably when applying comparatively viscous, waxy removers, the fountain-brush shown in Fig. 2 is employed, the jet of remover being injected into the hollow stem of pipe 21 and thence into the V-shaped space 25 immediately below the enlargement 26 surrounding the pipe 21.

Valves of the usual type common to air-pumps, namely, *a*, *b*, and *c* are provided as shown and if desired an additional nut 19' may be inserted as shown to permit of more accurate adjustment of the needle-valve 17.

Removers which are capable of acting as auto-washes, such as those containing only volatile solvents and free from acids, alkalies and film-forming ingredients in sufficient amounts to materially retard the evaporation of the volatile, non-aqueous solvents of paint and varnish are especially valuable in practice, owing to the fact that while benzene, benzin, gasolene and the like "raise the grain" of the wood, necessitating subsequent "sand-papering" prior to the application of the fresh paint or varnish, the said removers, consisting for example of one part methyl alcohol and three parts benzene, does not require "sand-papering" as the "grain" of the wood is entirely unaffected thereby.

The term "dried" as used in the specification and claims in connection with paint and varnish surfaces, relates to surfaces which have been oxidized or weathered.

The term "non-aqueous" solvent or solvents, used in the specification and claims relates to paint and varnish solvents which are commonly termed non-aqueous, as distinguished from aqueous acid solvents, such as acetic acid, and aqueous alkaline solvents, such as ammoniacal solutions, and the like, which, as commercially, known contain large amounts of water, for example commercial acetic acid contains from 70% to 40% of water, and usually the former amount.

Having thus described my invention, I claim:

1. The process of removing paint and varnish, which consists in causing a pneumatically-propelled jet of a paint and varnish remover, containing highly volatile non-aqueous solvent of dried films of paint and varnish and free from sufficient amounts of aqueous acid and alkaline solutions capable of dissolving dried films of paint and varnish, to materially retard the evaporation of the highly volatile, non aqueous solvent aforesaid, to impinge against an exposed surface of dried paint or varnish, and then removing the softened, slush-like film resulting from said treatment, substantially as described.

2. The process of removing paint and varnish, which consists in causing a pneumatically-propelled jet of a paint and varnish remover, containing highly volatile, non-aqueous solvent of dried films of paint and varnish and free from sufficient amounts of waxy, film-forming compounds to produce a film and effectively retard the evaporation of the highly volatile solvent, upon exposure to the atmosphere, to impinge against an exposed surface of dried paint or varnish, whereby the evaporation of the volatile ingredients is substantially retarded and an efficient penetration of the said solvent into the pores of and beneath the film of paint or varnish treated is secured, and then removing the softened, slush-like film resulting from said treatment, substantially as described.

In testimony whereof, I have signed my name to this specification in the presence of two subscribing witnesses, this twenty-third day of July 1907.

JOHN M. WILSON.

Witnesses:
W. H. SWENARTON,
CHARLES E. WIRZ.